US008942893B2

(12) United States Patent
Rosa et al.

(10) Patent No.: US 8,942,893 B2
(45) Date of Patent: Jan. 27, 2015

(54) PREDICTIVE BOOM SHAPE ADJUSTMENT

(75) Inventors: Uriel Rosa, Woodland, CA (US);
Arthur F. Lange, Sunnyvale, CA (US);
John William Peake, Mountain View, CA (US); Gurcan Aral, Cupertino, CA (US); Gregory Daniel Chiocco, Sunnyvale, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 36 days.

(21) Appl. No.: 13/607,411

(22) Filed: Sep. 7, 2012

(65) Prior Publication Data
US 2014/0074360 A1    Mar. 13, 2014

(51) Int. Cl.
*G05D 3/12* (2006.01)
*A01M 7/00* (2006.01)

(52) U.S. Cl.
CPC .............. *G05D 3/12* (2013.01); *A01M 7/0057* (2013.01)
USPC ............. 701/50; 701/450; 701/461; 701/468; 701/532; 239/159; 239/161; 239/164

(58) Field of Classification Search
None
See application file for complete search history.

(56) References Cited

U.S. PATENT DOCUMENTS

| | | | |
|---|---|---|---|
| 4,441,655 A * | 4/1984 | Blumhardt | 239/163 |
| 4,507,910 A * | 4/1985 | Thornley et al. | 56/10.2 E |
| 5,296,702 A | 3/1994 | Beck et al. | |
| 5,348,226 A * | 9/1994 | Heiniger et al. | 239/1 |
| 5,389,781 A | 2/1995 | Beck et al. | |
| 5,585,626 A * | 12/1996 | Beck et al. | 250/222.1 |
| 5,763,873 A | 6/1998 | Beck et al. | |
| 5,789,741 A | 8/1998 | Kinter et al. | |
| 5,809,440 A * | 9/1998 | Beck et al. | 701/50 |
| 5,837,997 A * | 11/1998 | Beck et al. | 250/227.11 |
| 5,931,882 A * | 8/1999 | Fick et al. | 701/50 |
| 5,955,973 A * | 9/1999 | Anderson | 340/988 |
| 6,085,135 A * | 7/2000 | Steckel | 701/50 |
| 6,199,000 B1 * | 3/2001 | Keller et al. | 701/50 |
| 6,206,406 B1 * | 3/2001 | May et al. | 280/656 |
| 6,553,299 B1 * | 4/2003 | Keller et al. | 701/50 |
| 6,726,120 B2 * | 4/2004 | Schaffter et al. | 239/69 |
| 6,834,223 B2 * | 12/2004 | Strelioff et al. | 701/50 |
| 2003/0187560 A1 * | 10/2003 | Keller et al. | 701/50 |
| 2006/0118653 A1 * | 6/2006 | Shivak | 239/166 |
| 2006/0118654 A1 * | 6/2006 | Shivak | 239/166 |
| 2009/0099737 A1 * | 4/2009 | Wendte et al. | 701/50 |

(Continued)

FOREIGN PATENT DOCUMENTS

| | | |
|---|---|---|
| EP | 2186405 A1 | 5/2010 |
| FR | 2965453 A1 | 4/2012 |

OTHER PUBLICATIONS

Notification of Transmittal of the International Search Report and the Written Opinion of the International Searching Authority, or the Declaration. International Application No. PCT/US2013/058238. International Filing Date: Sep. 5, 2013. Mail Date: Apr. 28, 2014.

*Primary Examiner* — Thomas Tarcza
*Assistant Examiner* — Richard Goldman
(74) *Attorney, Agent, or Firm* — Faegre Baker Daniels LLP

(57) ABSTRACT

A boom is attached to an application vehicle for applying a product during an agricultural application. The boom includes one or more sections that can be dynamically adjusted to satisfy one or more adjustment criteria. A boom controller communicates actuation commands to a boom adjustment system to dynamically adjust the shape of the boom.

29 Claims, 9 Drawing Sheets

(56) References Cited

U.S. PATENT DOCUMENTS

| | | | |
|---|---|---|---|
| 2011/0153168 A1* | 6/2011 | Peterson et al. | 701/50 |
| 2011/0266365 A1* | 11/2011 | Hrnicek et al. | 239/164 |
| 2011/0282554 A1* | 11/2011 | Keye | 701/49 |
| 2013/0238200 A1* | 9/2013 | Woodcock | 701/50 |

* cited by examiner

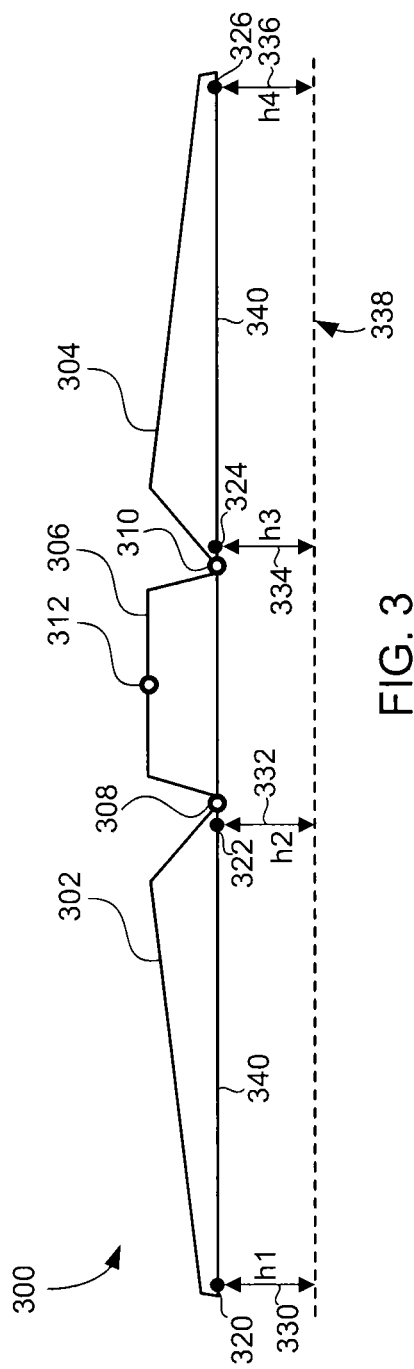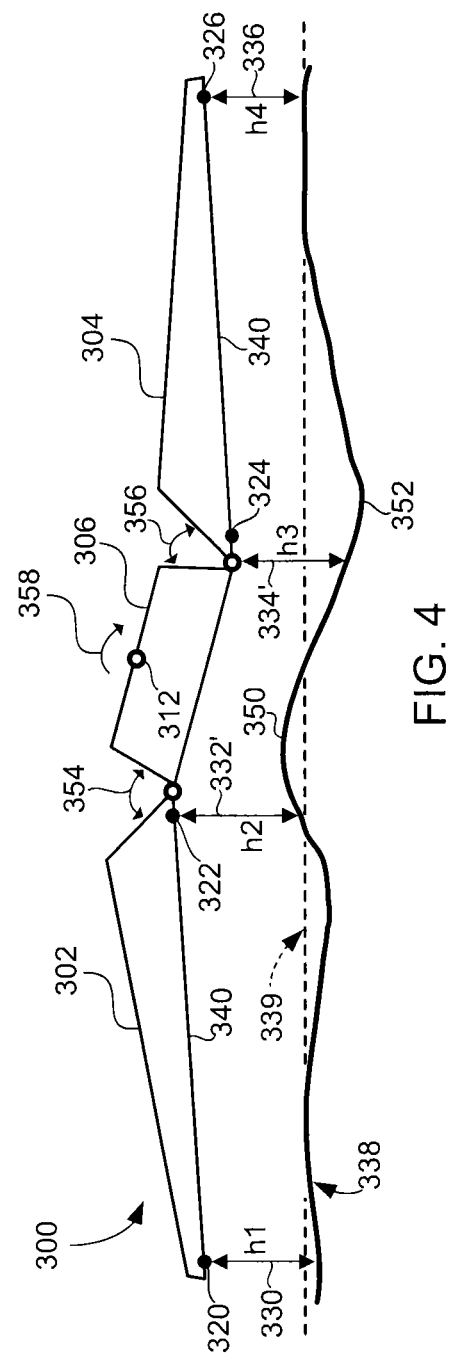

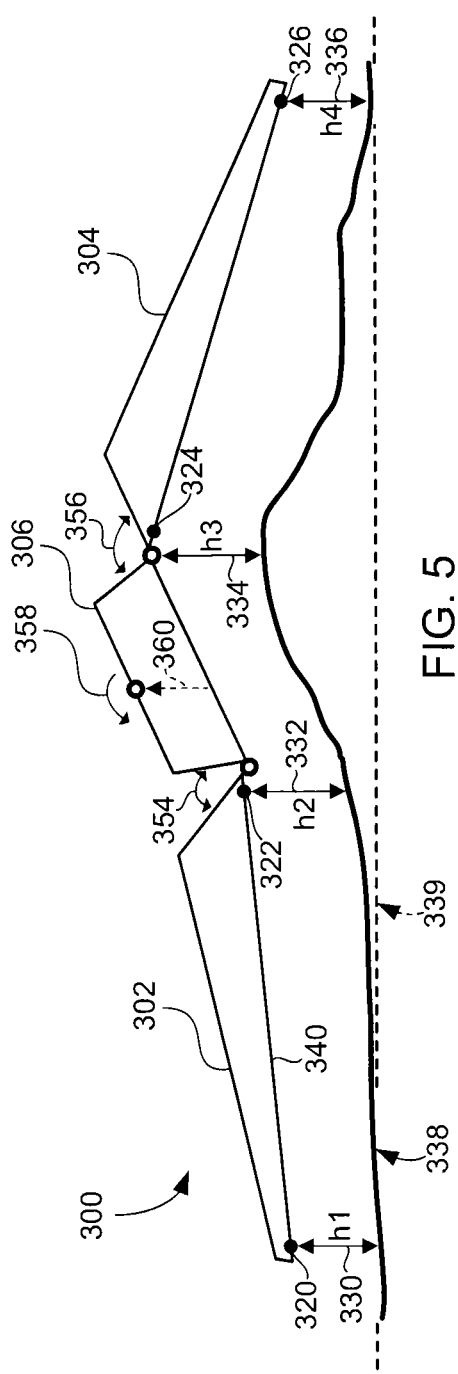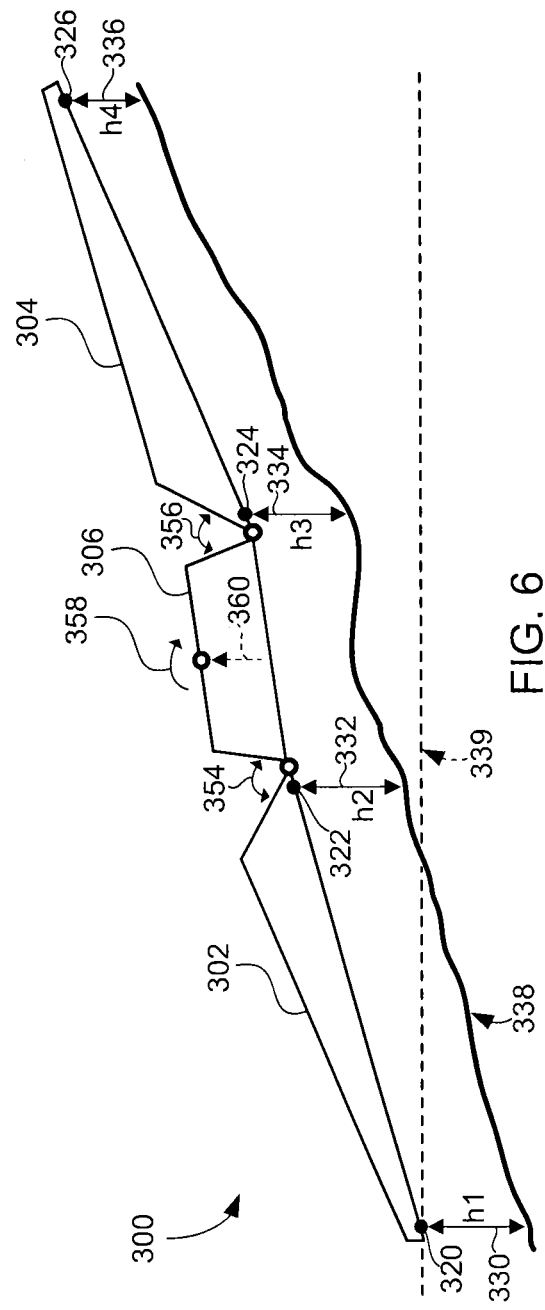

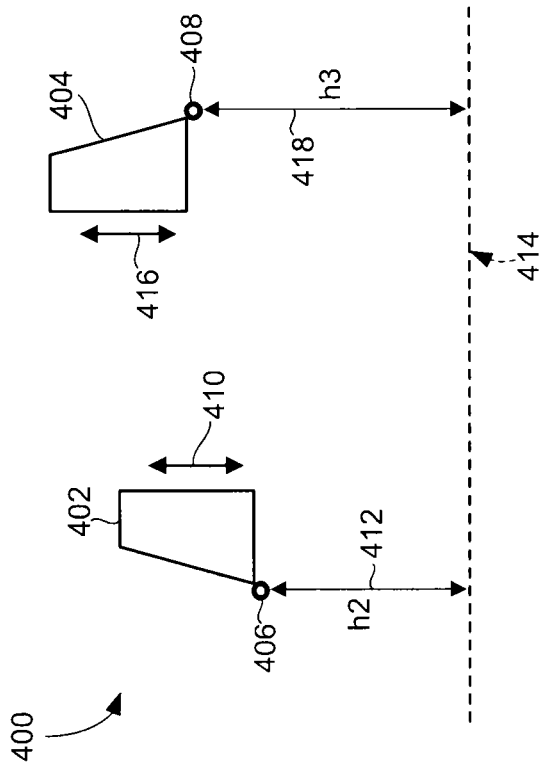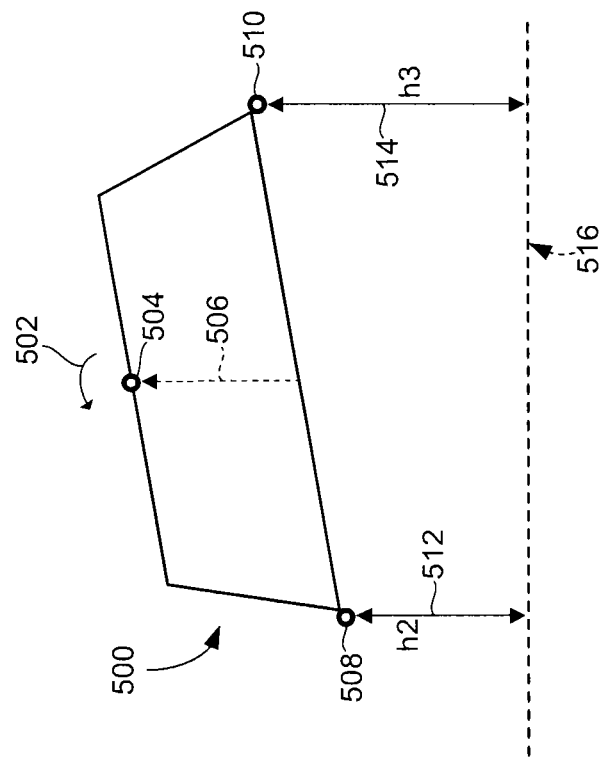

PREDICTIVE BOOM SHAPE ADJUSTMENT

BACKGROUND

In the agricultural industry, booms are used to apply materials such as pesticides, herbicides, and fertilizers. Typically, booms are adjustably attached to an application vehicle such as a tractor or other device that suspends and carries the boom over a ground surface as the materials are applied. Many booms use spray nozzles to spray the material onto, for example, a crop. Ground surfaces often include obstacles such as objects and contours that make the ground surfaces uneven, which can, for example, affect the consistency of the application of the materials and/or can possibly damage the boom.

SUMMARY

In embodiments, a boom controller facilitates dynamic adjustment of a boom shape as the application vehicle travels over a ground surface. In embodiments, the boom controller obtains distance measurements from a plurality of sensors. Some of these distance measurements indicate, for example, a distance from one or more portions of the boom to a ground surface. In that situation, the boom controller compares each distance measurement to an adjustment criterion to identify whether an elevation adjustment of the boom is needed. In response to identifying a need for an elevation adjustment, the boom controller communicates one or more actuation commands to a boom actuation system that adjusts the shape (e.g., height) of one or more portions of the boom. Also, in embodiments, a look-ahead module (LAM) identifies, for example, a vehicle's motion and anticipates a need to adjust the shape of the boom in view of, for example, an upcoming obstacle and/or an upcoming curve along a path of the application vehicle. The boom controller communicates one or more actuation commands that can be executed before the vehicle encounters the obstacle or curve. In embodiments, actuation commands can be communicated as a result of information from a combination of 1) sensors that measure a distance between the sensor and a ground, or crop, surface substantially beneath the sensor, and 2) sensors that measure a distance between a sensor and an upcoming object.

While multiple embodiments are disclosed, still other embodiments of the invention will become apparent to those skilled in the art from the following detailed description, which shows and describes illustrative embodiments of the invention. Accordingly, the drawings and detailed description are to be regarded as illustrative in nature and not restrictive.

BRIEF DESCRIPTION OF THE DRAWINGS

FIG. 3 illustrates a suspended boom with three boom sections and four sensors in accordance with embodiments of the invention;

FIG. 4 illustrates the suspended boom of FIG. 3 over a first example of uneven terrain in accordance with embodiments of the invention;

FIG. 5 illustrates the suspended boom of FIG. 3 over a second example of uneven terrain in accordance with embodiments of the invention;

FIG. 6 illustrates the suspended boom of FIG. 3 over a third example of uneven terrain in accordance with embodiments of the invention;

FIG. 7 illustrates a vertical movement of a left boom section and a vertical movement of a right boom section in accordance with embodiments of the invention;

FIG. 8 illustrates rotational and vertical movements of a center section in accordance with embodiments of the invention;

Figure 1:
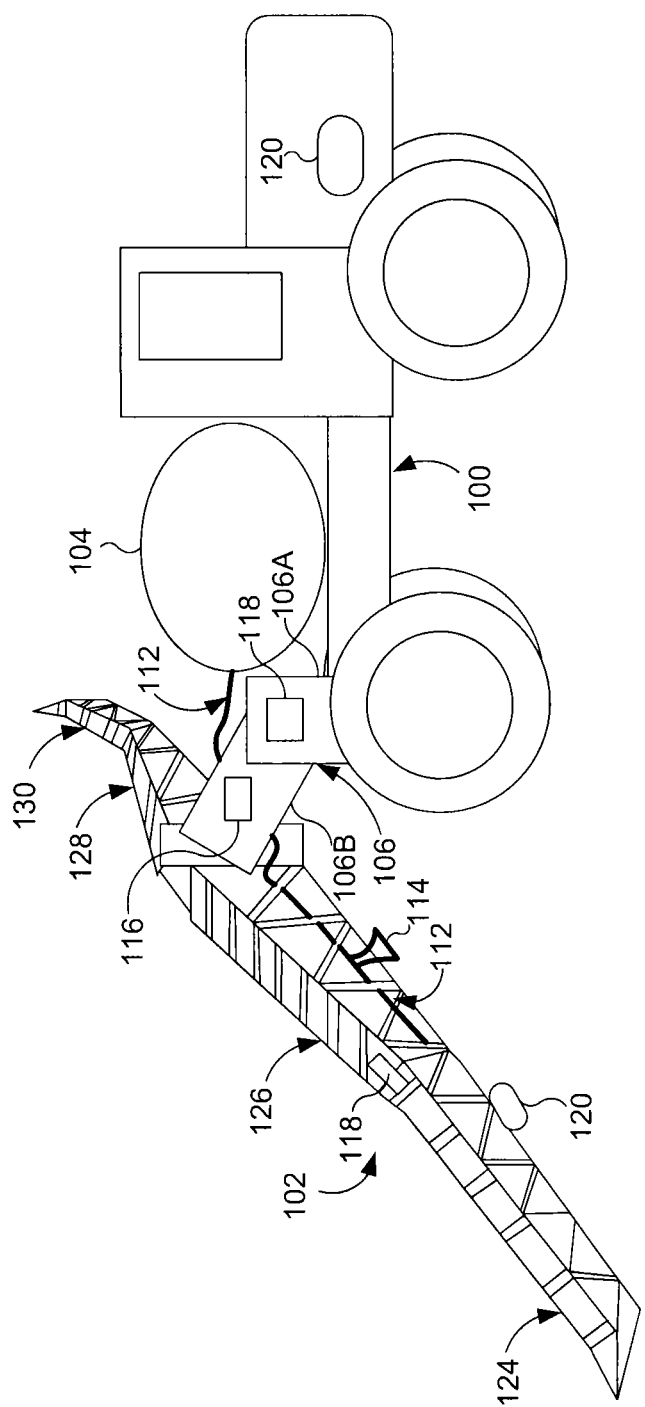
FIG. 1 illustrates an application vehicle with a boom in accordance with embodiments of the invention.

While the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

Throughout an agricultural application, a goal can be to maintain the height of the boom (or various sections thereof) within a certain distance from the ground or the crop. To achieve this, continual adjustment of boom shape can be used to compensate for obstacles such as, for example, uneven terrain, crops, weeds, other objects, fences, and the like. In embodiments, the shape of the boom ("boom shape") can be adjusted using actuators that move some boom sections with respect to other boom sections and/or with respect to the vehicle. In embodiments, the adjustments to the boom shape can be determined, using a boom controller, based on measurements obtained by proximity sensors coupled to the boom.

As used herein, the term "boom shape" refers to a set of orientations of each of the boom sections with respect to one or more of the other boom sections, with respect to the vehicle, with respect to a ground surface, or both. In embodiments, a ground surface can include the surface of the ground; a surface of a crop or crops; a surface of a weed or other plant; a surface of an object; a conceptual surface defined with respect to another ground surface, the boom, or the vehicle; a combination of two or more of these; or the like. In embodiments, a boom shape can be characterized by, for example, the angles between each pair of adjacent boom sections, rotational positions, the height of any one or more (or all) sections of the boom from a ground surface, or the like. A boom shape can be adjusted such that one or more adjustment criteria are satisfied, whereby, if the boom controller determines that an adjustment criterion is not satisfied (or anticipates that an adjustment criterion will not be satisfied), the boom controller can adjust the boom shape such that the adjustment criterion is (or will be) satisfied. Adjustment criteria can include any number of different types of criteria used to maintain certain characteristics of a boom shape such as, for example, set point values (SPs) (e.g., minimum distances, maximum distances, etc.), distance ranges, servo algorithms, tolerances, and the like.

According to embodiments, actuators can have a limited response time (e.g., as a result of communication delays in the control system, time delays due to time required to build hydraulic pressure, etc.), which can result in adjustment of the boom shape occurring after the need for the adjustment passes. To mitigate the potential effect of limited response time, embodiments include a look-ahead module (LAM) that anticipates situations in which one or more adjustment criteria will not be satisfied, thereby allowing for actuation commands to be executed such that the boom shape can be adjusted before (or contemporaneous with) encountering the situation.

FIG. 1 depicts an illustrative application vehicle 100. In embodiments, the application vehicle 100 is a tractor that carries a boom 102 to which one or more tools can be mounted for performing any number of various agricultural tasks. In embodiments, the application vehicle 100 can also include a product tank 104. A boom mount 106 can be coupled to the application vehicle 100. Although the illustrative application vehicle 100 of FIG. 1 is depicted as a tractor for carrying the boom 102, it should be appreciated by individuals having skill in the relevant arts that the application vehicle 100 can, in fact, be any number of other types of vehicles, such as a truck or a towed vehicle (e.g., a trailer) to which the boom 102 is attached.

The boom 102 can include any type of suitable boom or similar tool-bar to which various types of agricultural tools can be attached. For instance, according to embodiments, the boom 102 can include hardware used for spraying nutrients, pesticides, and the like. The boom 102 can include plumbing 112 that is adapted for transporting a product (e.g., liquid, powder, etc.) from the product tank 104 to an application tool 114 such as, for example, a spray nozzle. The application vehicle 100 can also include rate control valves 116 that control the flow of product through the plumbing 112. In embodiments, the boom 102 can include hardware used for depositing seeds, for eliminating weeds, or the like.

As illustrated, the boom 102 is moveably coupled to the application vehicle 100 via the boom mount 106. As shown in FIG. 1, the boom mount 106 includes a support frame 106A, which is fixed to the application vehicle 100, and an adjustable frame 106B, which is moveably coupled to the support frame 106A. According to embodiments, the adjustable frame 106B facilitates adjustment of the boom 102 relative to the support frame 106A (and, thus, relative to the application vehicle 100). The adjustable frame 106B can be moveably coupled to the support frame 106A using any number of different mechanical connections such as, for example, hydraulic pistons, pivots, bearings, slideable rails, gears, and the like. In embodiments, the adjustable frame 106B includes one mechanism that facilitates movement of the boom 102 with respect to the vehicle 100, while, in embodiments, the adjustable frame 106B can include a number of mechanisms that facilitate movement of individual sections or groups of sections (e.g., wings) of the boom 102. According to embodiments, the adjustable frame 106A can facilitate adjustment of the relative position of the boom 102 such as by allowing the boom 102 to be adjusted in any number of different directions. In embodiments, the boom 102 can be adjusted vertically; the boom 102 can be pivoted (e.g., rotated) about the support frame 106A; or the like. In embodiments, the boom mount 106 also includes mechanical connections (e.g., actuators 118) for facilitating adjustment of individual sections of the boom 102, as well.

As is further illustrated in FIG. 1, the boom 102 and application vehicle 100 can include a number of sensors 120. The sensors 120 can be any type of sensors known in the art and can be used for detecting the height of the boom 102 with respect to the ground or some other object below the boom 102 (e.g., crops, weeds, rocks, and etc.), the speed of the application vehicle 100, the direction of travel of the application vehicle 100, the acceleration of the application vehicle 100, changes in elevation ahead of the application vehicle 100, the presence of foliage on the ground, and the like.

For instance, in embodiments, the sensors 120 can include a number of different types of sensors such as, for example, GPS antennas; proximity sensors, which can include downward-looking sensors (e.g., sensors that measure a distance between the sensor and a ground surface substantially beneath the sensor) and forward-looking sensors (e.g., sensors that obtain measurements related to distances, the presence of obstacles, and the like, ahead of the application vehicle or at an angle with respect to the vertical); inertial measuring units (IMUS) that can be mounted to the boom 102 or to any other part of the application vehicle 100; color-detection sensors; sensors that measure the positions of various links of the boom (e.g., angles with respect to other sections, angles with respect to the ground or other surface, degrees of rotation of boom sections, etc.); and the like. Additionally, the sensors 102 can include sensors for determining motion data associated with the application vehicle 100. For example, motion sensors 120 can be employed that determine the speed, direction, steering angle, curvature, and/or acceleration of the vehicle and can include sensors that monitor axle rotation, transmission rotation, wheel rotation, and the like. Other examples of sensors include forward-looking sensors such as distance measurement lasers, positioned at a forward angle, that measure ground height (or height of other objects) at some distance ahead of the boom 102; a vertical plane spinning light detection and ranging (LIDAR) sensor that maps heights below and ahead of the boom 102; EDM sensors that optically measure the height of the boom 102 above the ground or crop; and the like.

According to embodiments of the invention, the boom 102 can include one or more boom sections 124, 126, 128, and 130. For example, the boom 102 illustrated in FIG. 1 includes an outer-right boom section 124, an inner-right boom section 126, an inner-left boom section 128, and an outer-left boom section 130. In embodiments, the boom 102 can include any other number of sections (e.g., two sections, three sections, four sections, five sections, six sections, etc.). In embodiments, one or more of the sections 124, 126, 128, and 130 can move with respect to other sections. For example, with reference to FIG. 1, section 124 may be attached by pivots to section 126 and section 128 may be attached by pivots to section 130. Embodiments of the invention facilitate automatic adjustment of the shape of the boom 102 by adjusting the positions of one or more (or all) of the boom sections 124, 126, 128, and 130 in response to determining that one or more adjustment criteria are not satisfied (or anticipating that the one or more adjustment criteria will not be satisfied).

As indicated above, the boom 102 and, in embodiments, the boom mount 106, can include any number of different types of actuators 118. Actuators 118 can include different types of boom-adjustment mechanisms such as, for example, mechanical servos, hydraulic systems, and the like, to facilitate adjustment of the boom 102. These actuators may also include actuators 118 for adjusting various boom sections 124, 126, 128, and 130. According to embodiments of the invention, the boom shape can be adjusted automatically. In embodiments, actuators 118 can include actuators that adjust the height of the boom (e.g., by adjusting a center section of the boom) with respect to the vehicle 100 or a ground surface; actuators that pivot boom sections with respect to adjacent boom sections; and the like.

In embodiments, the boom shape is dynamically adjusted during an application operation as the vehicle 100 moves over terrain such that one or more adjustment criteria are satisfied, e.g., so that various portions (e.g., sections) of the boom 102 are maintained at a desired position with respect to the ground, crops, weeds, or other objects. In embodiments, the boom shape is adjusted using one or more algorithms that determine adjustments of individual boom sections based on input from proximity (e.g., downward-looking) sensors that measure distances from the ground or other surface. Embodiments of the invention include facilitating dynamic boom shape adjustment based on measurements obtained using only downward-looking sensors (in particular, without requiring a rotational sensor for determining the rotational position of the boom with respect to vehicle 100), thereby facilitating more efficient calculations for dynamic adjustment.

Figure 12:
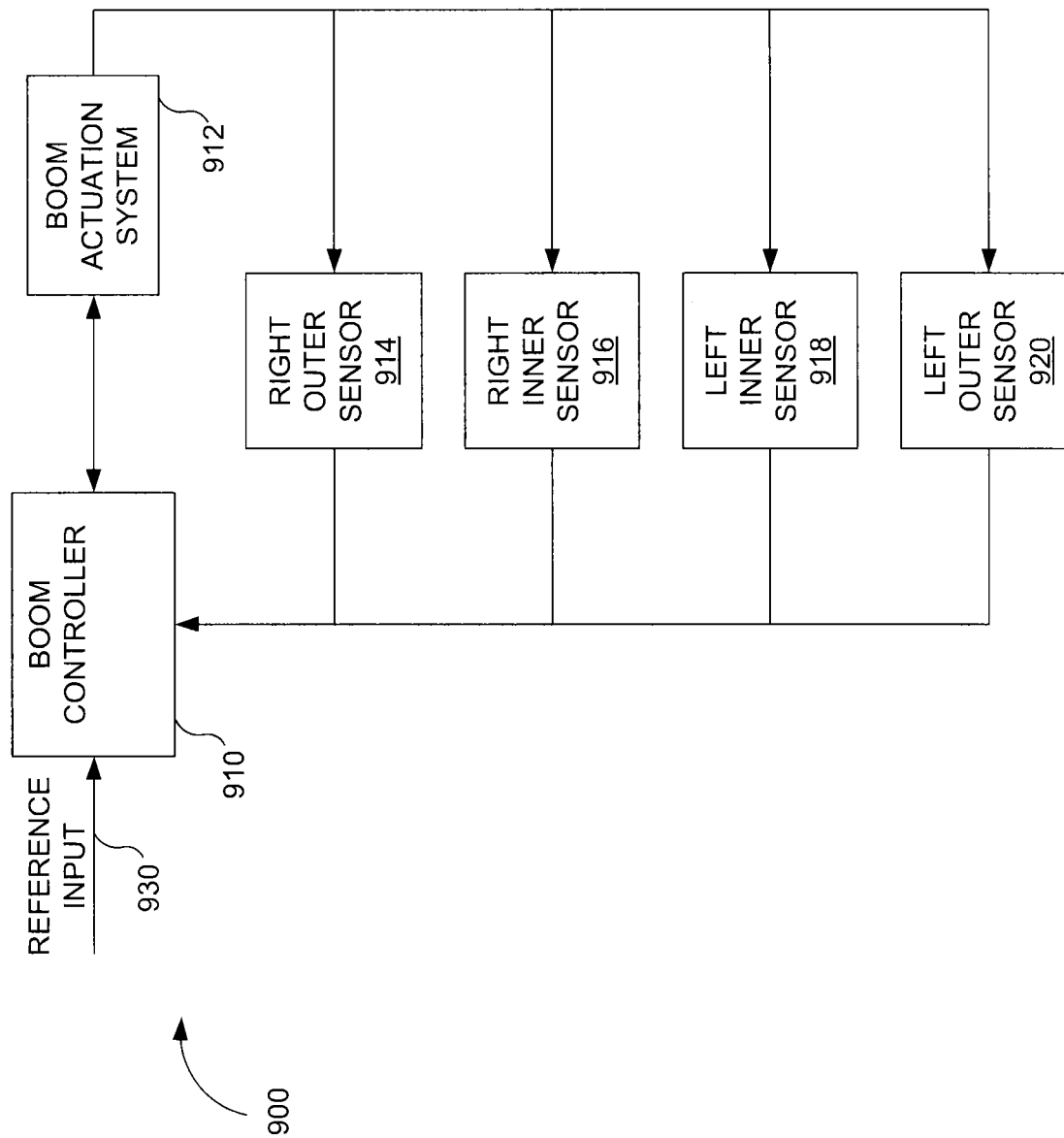
FIG. 12 is a schematic block diagram illustrating an operating environment in accordance with embodiments of the invention.

For example, in embodiments, as shown in FIG. 12, an operating environment 900 associated with an application vehicle 100 can include a boom controller 910 that controls the boom shape based on measurements obtained from a plurality of downward-looking sensors 914, 916, 918, and 920. The embodiments depicted in FIG. 12 include a boom controller 910 that communicates actuation commands to a boom actuation system 912 to adjust the shape of the boom. Coupled to the boom controller 910 are a right outer sensor 914, a right inner sensor 916, a left inner sensor 918, and a left outer sensor 920. In embodiments, the boom controller 910 receives a reference input 930, which can include, for example, an initial boom shape (e.g., an initial position of each boom section) and/or an adjustment criterion (e.g., a predetermined height for each boom section, or portions thereof, with respect to a ground surface, a range of such heights, etc.). The boom controller 910 receives distance measurements from the downward-looking sensors 914, 916, 918, and 920, and can determine how to adjust each boom section based on the distance measurements and the reference input 930. The boom controller 910 communicates actuation commands to the boom actuation system 912, which adjusts the positions of each boom section according to the actuation commands.

In embodiments (and embodiments overlapping with those mentioned above), a "Look-Ahead Module" (LAM) can be used to anticipate a need for adjusting the boom shape, thereby facilitating dynamic adjustment in which the actuation commands are executed prior to the vehicle's arrival at the location for which adjustment is intended. In embodiments, proximity sensors (e.g., that determine a height above a ground surface, local changes in elevation, and the like) can be used to supplement the LAM-based adjustment process by providing real-time (or near-real-time) data that can be used to refine actuation commands, update topographic maps, and the like. In embodiments, to facilitate the timing of boom shape adjustments, an actuation command can include an instruction corresponding to a time at which the adjustment should begin (e.g., an instruction directing the boom adjustment system to execute the actuation command at a particular time).

As is further described below, according to embodiments, the LAM anticipates that, at a predicted location of at least a portion of the boom at a future time, one or more adjustment criteria will not be satisfied. The LAM can achieve this by applying an algorithm that takes as input various information such as, for example, a current motion (e.g., speed, direction, acceleration, steering angle, vehicle tilt/roll, etc.) of the vehicle, a current geographic location of the vehicle, topographic map data, operating path information, and the like. The LAM can receive such information periodically or continuously. In embodiments, the LAM receives information by referencing, for example, motion sensors, GPS components, topographic maps, operating paths, and the like. In embodiments, the LAM can determine, based on received information, the type and degree of boom-adjustment required and, in response, a boom controller can communicate actuation commands to a boom actuation system to cause the boom shape adjustment. If the LAM does not anticipate an unsatisfied adjustment criterion, the LAM can reference a new set of information (e.g., data corresponding to a next point in time) and reapply the algorithm using the new set of information. According to embodiments, the LAM can repeat this process until it anticipates an unsatisfied adjustment criterion (or criteria). Additionally, immediately after, before, or simultaneous with, communication of an actuation command, the LAM processes new information to identify the next instance of a need to adjust the boom shape, based on adjustment criteria.

According to embodiments, the LAM can anticipate an upcoming unsatisfied adjustment criterion based on a topographic map. As used herein, the term "based on" is not meant to be restrictive, but rather indicates that a determination, prediction, calculation, or the like, is performed by using, at least, the term following "based on" as an input. For example, a LAM or boom controller that anticipates an adjustment criterion based on a topographic map may also base the anticipation on other factors as well such as, for example, a current motion, a current geographic position, or the like. In embodiments, the LAM can determine, based on the current geographic position and current motion of the vehicle, that at a particular future time, the boom adjustment system should begin to adjust the boom shape. Accordingly, the boom controller can communicate an actuation command (or a sequence of actuation commands) to the boom adjustment system, causing the boom shape to be adjusted to satisfy the adjustment criteria. Moreover, because the LAM can, in embodiments, reference a topographic map associated with the geographic region in which the vehicle is traveling, the LAM can identify the amount of adjustment necessary to compensate for an entire change in elevation associated with a region and the boom controller can begin procedures to re-adjust the boom shape as the vehicle travels.

Additionally, embodiments can facilitate adjustment of sections of the boom while the application vehicle is turning. Often, when an application vehicle turns (e.g., at the end of a crop row), the momentum of the vehicle can cause the vehicle to tilt or roll, thus driving the outside end of the boom toward the ground (and causing the inside end of the boom to rise), which can cause damage to the boom and/or uneven product application. According to embodiments, as the vehicle moves through a field toward a turn in the vehicle's path, the LAM can identify the coming turn. In embodiments, upcoming turns can be identified, for example, by referencing an operating path, which generally is predetermined and stored in a memory component; by referencing current velocity and steering angle or curvature measurements; and the like. Using a current geographic position and a current motion associated with the vehicle, the LAM can anticipate that, during the turn, an adjustment criterion will not be satisfied (e.g., when the vehicle is traveling fast enough to import momentum sufficient to drive an outer boom section toward the ground). That is, the LAM can determine, based on a current position and motion of the vehicle, that, at a particular future time the actuators associated with the section(s) of the boom corresponding to the outside of the turn should begin to adjust the height of the outside section(s) of the boom. Accordingly, the boom controller can communicate one or more actuation commands, causing the boom shape to be adjusted to compensate for the anticipated turn, thereby compensating for the momentum of the outside section(s) of the boom. Moreover, because the LAM can, in embodiments, reference an operating path associated with the particular application task, it can determine an anticipated turn radius and can identify the amount of adjustment necessary to compensate for the entire turn radius such that the boom controller can begin procedures to lower the boom section again as the vehicle exits the turn. In embodiments, for example, inertial measuring units (IMUs) can be used to identify the various forces acting upon the sections of the boom, which can be utilized to further refine actuation commands.

Embodiments of the invention rely on topography information and, in embodiments, may not require a downward-looking sensor to detect a current distance between a point on the boom to a ground surface or crop. In other embodiments, proximity sensors can be utilized in conjunction with a LAM, thereby facilitating additional refinement of actuation commands. For example, in embodiments, the topographic map may not provide an accurate representation of the actual ground surface (e.g., due to being coarse, outdated, etc.). In embodiments, proximity sensors can be used to collect refined topographic information and update the topographic map; to identify inaccuracies in the current topographic map; to adjust one or more of the actuation commands in a command sequence to compensate for inaccuracies; to establish indications of elevation changes, objects, and the like, for current and future use when a topographic map was not originally available; and the like. In embodiments, proximity sensors can be used to account for vehicle carriage flexibility such as, for example, the compressibility of the tires during turns, which can cause an additional roll (tilt) to the vehicle, thereby affecting the boom section heights. In embodiments, for example, accelerometers and gyroscopes can be useful in this type of refinement. Proximity sensors can also be used to determine crop location, crop height, and the like.

Figure 2:
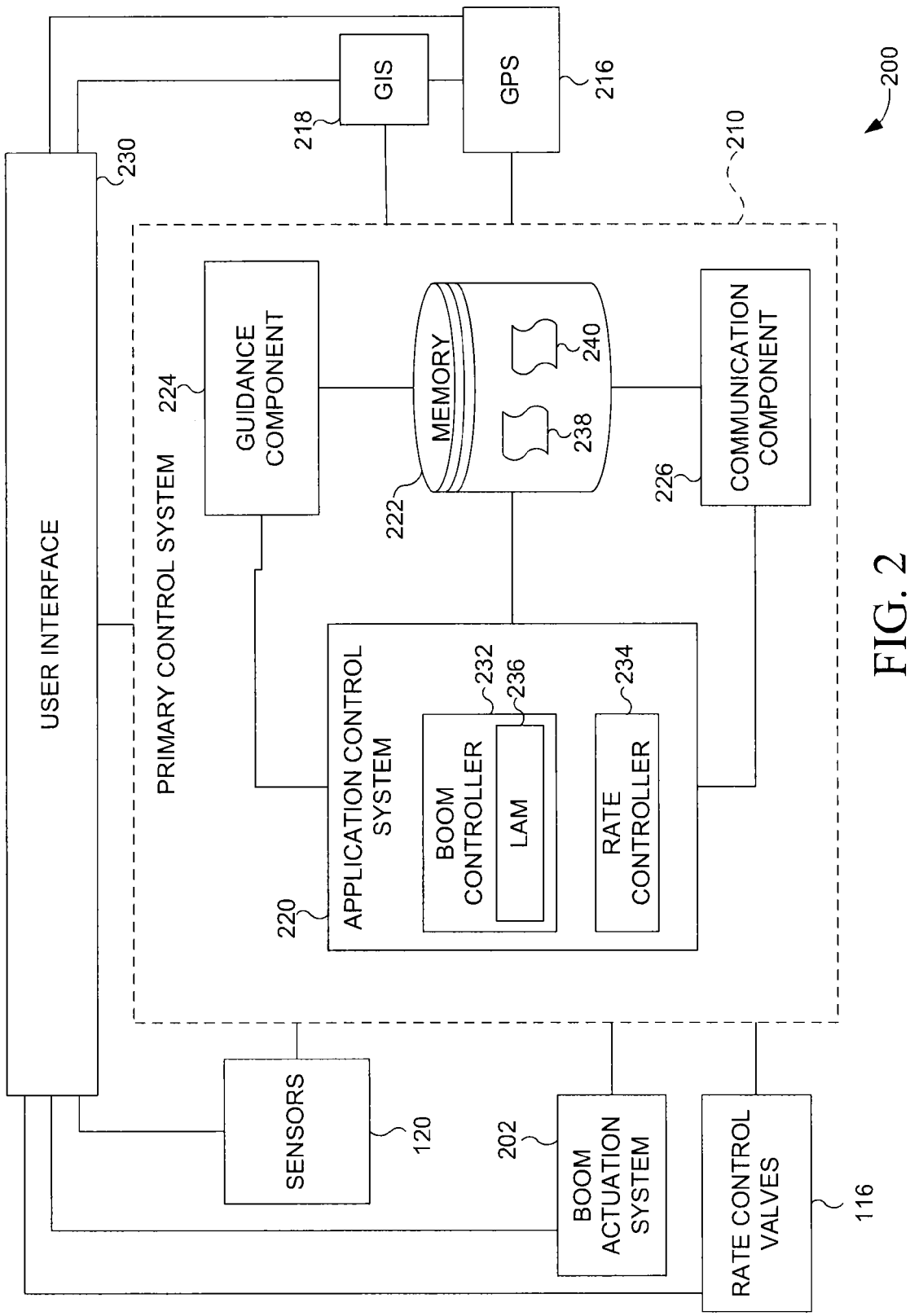
FIG. 2 is a block diagram illustrating an operating environment in accordance with embodiments of the invention.

As illustrated in FIG. 2 (described below), the LAM 236 can be integrated with a vehicle operating environment 200 and can communicate with other components of the operating environment 200 to achieve aspects of the functionality described herein.

FIG. 2 depicts an illustrative operating environment 200 associated with an application vehicle such as, for example, the illustrative application vehicle 100 depicted in FIG. 1. The illustrative operating environment 200 includes a primary control system 210 that can be used to control the motion of the application vehicle 100 and to control operation of a boom actuation system 202 and rate control valves 116. Additionally, as shown in FIG. 2, the primary control system 210 is communicatively coupled to a global positioning system (GPS) component 216, which can, in embodiments, be communicatively coupled to a geographic information system (GIS) 218. The primary control system 210 includes an application control system 220 that, in embodiments, is what specifically controls the operation of the boom actuation system 202 and rate control valves 116. The illustrative operating environment also includes sensors 120 and a user interface (UI) 230.

As is further depicted in FIG. 2, the primary control system 210 also includes a memory component 222, a guidance component 224, and a communication component 226. As is discussed throughout, the memory component 222 can be used to store any number of different types of information such as, for example, GPS data, motion data, operating paths, weather information, topographic maps, adjustment criteria, computer-executable instructions, and the like. According to embodiments, the guidance component 224 can be used to control aspects of the motion of the application vehicle 100 and can include features such as, for example, assisted steering, automated steering, implement steering, and the like. The communication component 226 can facilitate communication between any one or more of the components of the primary control system 210 and/or other components or other devices. For instance, in embodiments, the communication component 226 provides a communication interface between the primary control system 210 and a computing device located in a farm office or another vehicle. In embodiments, for example, the communication component 226 can facilitate communication between the primary control system 210 and a handheld device.

The GPS component 216 can be any component of any type of GPS or other Global Navigation Satellite System (GNSS). For example, in embodiments, the GPS component 216 can include one or more GPS antennae, one or more processors, memory, communications modules, a user interface, and the like. In embodiments, the GPS component 216 communicates with, or is integrated with, a geographic information service (GIS) 218. The GPS component 216 and/or the GIS 218 can be used to create maps and other digital representations of geographic information that can be stored in the memory component 222 as a map 238. As the term is used herein, a map 238 refers to any type of data structure containing information associated with geographic data. Examples of the map 238 include topographic maps, listings of geographic coordinates, etc. In embodiments, a visual representation of the map 238 can be presented to a user via the UI 230. In embodiments, the UI 230 can also be used to manipulate the visual representation of the map 238 or even the map 238 (e.g., data) itself.

The memory component 222 also can include an operating path 240. Often, a particular type of product application or other task will be performed along a predetermined path through a field (e.g., an operating path 240). For example, operating paths can be used to program automatic steering operations, rate control operations, and the like. In embodiments, the operating path 240 can include, for example, geographic coordinates defining a particular path that the vehicle will (or may) traverse as it performs a particular task. The operating path 240 can be accessed from the memory component 222 by any number of different components of the operating environment 200. In embodiments, the memory component 222 can include a number of different operating paths 240.

As shown in FIG. 2, the application control system 220 can include a boom controller 232 and a rate controller 234. The boom controller 232 can, in embodiments, include a look-ahead module (LAM) 236. In embodiments, the LAM 236 can be a separate component from the boom controller 232 and, in embodiments, the LAM 236 can be hosted on a computing device remote from the operating environment 200. According to embodiments, the boom controller 232 activates the boom actuators 118 via the boom actuation system 202 to cause adjustment of the positions of the boom sections. The rate controller 234 can communicate with the control valves 116 to control the rate at which a product is delivered by plumbing 112 associated with the boom 102. According to embodiments, control valves 116 can include valves, solenoids, actuators, and the like. In embodiments, the boom may include mechanical tools such as, for example, tillers, seeders, and the like, in which case the rate controller 234 can control the operation of those tools.

According to embodiments, the boom actuation system 202 includes actuators 118 that facilitate control of a position of the boom 102 relative to the boom mount 106 of the vehicle 100 and positions of boom sections relative to other boom sections (and/or relative to the boom mount 106, a ground surface, etc.). In embodiments, the boom actuation system 202 can include drivers, valve manifolds, and the like. For example, in embodiments, each boom section is associated with one or more drivers, one or more valve manifolds, and one or more actuators 118 (e.g., hydraulic cylinders, mechanical actuators, etc.).

The illustrative operating environment 200 shown in FIG. 2 is not intended to suggest any limitation as to the scope of use or functionality of embodiments of the invention disclosed throughout this document. Neither should the illustrative operating environment 200 be interpreted as having any dependency or requirement related to any single component or combination of components illustrated therein. For example, in embodiments, the illustrative operating environment 200 can include additional components such as, for example, an interface module (not illustrated) that includes circuitry to interface boom-mounted sensors 120 with the UI 230 such as by providing an interface between serial connections and controller area network (CAN) connections. Additionally, any one or more of the components depicted in FIG. 2 can be, in embodiments, integrated with various ones of the other components depicted therein (and/or components not illustrated). Any number of other components or combinations of components can be integrated with the illustrative operating environment 200 depicted in FIG. 2, all of which are considered to be within the scope of this disclosure.

Embodiments of the disclosed subject matter are described in the general context of computer-executable instructions. Computer-executable instructions can include, for example, computer code, machine-useable instructions, and the like such as, for example, program components, capable of being executed by one or more processors associated with a computing device. Generally, program components including routines, programs, objects, modules, data structures, portions of one or more of the preceding, and the like, refer to code that, when executed, causes a computing device to perform particular tasks (e.g., methods, calculations, etc.) or implement or manipulate various abstract data types. Some or all of the functionality contemplated herein can also be implemented in hardware and/or firmware.

In embodiments, the memory component 222 can include computer-readable media. Computer-readable media include both volatile and non-volatile media, removable and nonremovable media, and contemplate media readable by a database, a processor, a router, and various other networked devices. By way of example, and not limitation, computer-readable media can include media implemented in any method or technology for storing information. Examples of stored information include computer-executable instructions, data structures, program modules, and other data representations. Media examples include, but are not limited to, Random Access Memory (RAM); Read Only Memory (ROM); Electronically Erasable Programmable Read Only Memory (EEPROM); flash memory or other memory technologies; Compact Disc Read-Only Memory (CD-ROM), digital versatile disks (DVDs) or other optical or holographic media; magnetic cassettes, magnetic tape, magnetic disk storage or other magnetic storage devices; data transmissions; or any other medium that can be used to encode information and can be accessed by a computing device such as, for example, quantum state memory, and the like.

According to embodiments, various components of the operating environment 200 can be implemented on one or more computing devices that are communicatively coupled to the boom actuation system 202. According to embodiments, the computing device can include any type of computing device suitable for implementing embodiments of the invention. Examples of computing devices include "workstations," "servers," "laptops," "desktops," "tablet computers," "handheld devices," and the like, all of which are contemplated within the scope of FIG. 2 and reference to various components of the operating environment 200. In embodiments, components of the operating environment 200 can include more than one computing device such as, for example, in a distributing computing environment, a networked environment, and the like. For example, in embodiments, portions of the components of the primary control system 210 can be hosted on a computing device on the application vehicle 100, while other portions can be hosted on a handheld device, laptop, or other computing device. In embodiments, all of the components of the operating environment 200 can be hosted by one or more computing devices on the application vehicle 100.

In embodiments, a computing device includes a bus that, directly and/or indirectly, couples the following devices: a processor, a memory, an input/output (I/O) port, an I/O component, and a power supply. Any number of additional components, different components, and/or combinations of components can also be included in the computing device. The bus represents what may be one or more busses (such as, for example, an address bus, data bus, or combination thereof). Similarly, in embodiments, the computing device can include a number of processors, a number of memory components, a number of I/O ports, a number of I/O components, and/or a number of power supplies. According to embodiments, the processor (or processors) reads data from various entities such as the memory component 222, UI 230, or the sensors 116. For example, in embodiments, the processor executes computer-executable instructions that are stored in the memory component 222 to cause the computing device to execute program modules utilized by (or, in embodiments, represented by) the application control system 220, guidance component 224, and/or communication component 226.

In embodiments, as illustrated in FIGS. 3-6, boom shape adjustment can be effectuated using measurements obtained by downward-looking sensors. FIGS. 3-6 illustrate embodiments in which a boom 300 includes a left boom section 302, a right boom section 304, and a center section 306. The left boom section 302 is pivotably coupled to the center section 306 at a left pivot 308. The right boom section 304 is pivotably coupled to the center section 306 at a right pivot 310. The center section 306 may pivot about a center pivot 312. In addition, the center section 306 can move vertically. The boom 300 includes actuators (not shown) that are designed to adjust the position of each section of the boom 300. In embodiments, the boom 300 can include more or less than three sections. For example, the left boom section 302, the right boom section 304, and/or the center section 306 can each include multiple sections. Each of those sections can include one or more actuators for independent movement.

As illustrated in FIG. 3, in embodiments, the boom 300 includes a left outer sensor 320, a left inner sensor 322, a right inner sensor 324, and a right outer sensor 326. In embodiments, the boom 300 may include more or less than four sensors. In embodiments, at least some of the sensors are ultrasonic sensors that measure distances (e.g., "h1" 330, "h2" 332, "h3" 334, and "h4" 336) from the sensors to a ground surface 338 substantially beneath the sensors. According to embodiments, the ground surface 338 can be the terrain itself or can be the top of a crop or other object. In embodiments, the sensors can all be the same type of sensor (e.g., downward-looking sensors, as opposed to roll sensors). For example, embodiments use identical sensors and embodiments use similar, though not identical, sensors. As shown in FIG. 3, the left inner sensor 322 and the right inner sensor 324 are located on the left boom section 302 and the right boom section 304, respectively. In embodiments, the left inner sensor 322 and the right inner sensor 324 can be located on the center section 326. As also shown in FIG. 3, sensors can be placed near the bottom 340 of the boom 300, so that the sensors measure the distance from the bottom 340 of the boom 300 to the ground surface 338, substantially beneath the boom 300.

The shape of the boom 300 is controlled by a boom controller (such as, for example, the boom controller 232 illustrated in FIG. 2). In embodiments, the boom controller receives measurements from the sensors and determines, based on those measurements, that one or more adjustment criteria are not satisfied. The boom controller can determine a boom shape adjustment based on the measurements. For example, in embodiments, the boom controller can determine how to adjust each section of the boom to produce a boom shape that is appropriate for the contour of a ground surface 338. In embodiments, the boom controller determines the adjustments needed to each boom section so that the boom shape satisfies an adjustment criterion, e.g., each boom section remains at or near a predetermined height ("set point"), range of heights or the like, with respect to a ground surface 338. In embodiments, the adjustment criteria can be the same for all boom sections or can be different for some of the boom sections. The boom controller communicates one or more actuation commands to a boom adjustment system, which causes actuators to move boom sections to achieve a boom shape that is adapted to the ground surface ("adapted boom shape"). In this manner, the boom controller can, for example, maintain each section of the boom at or near a predetermined distance above the ground surface 338 while the boom 300 is moved over uneven terrain 338.

For example, as shown in FIG. 4, the ground surface 338 can include a bump 350 and a dip 352 with respect to the horizontal 339. As the boom 300 passes over the bump 350, the left inner sensor 322 measures the shortened distance h2 (332') between the sensor 322 and the ground surface 338 substantially beneath the sensor 322. Likewise, as the boom 300 passes over the dip 352, the right inner sensor 324 measures the increased distance h3 (334') between the sensor 324 and the ground surface substantially beneath the sensor 324. The left outer sensor 320 and the right outer sensor 328 report distances h1 330 and h4 336, respectively, that are unaffected by the bump 350 or the dip 352. Based on those four measurements, the boom controller can calculate how to adjust each boom section and can cause the boom adjustment system to move each boom section accordingly. As shown in FIG. 4, the left boom section 302 can rotate in a counter clockwise fashion (354) with respect to the center section 306, the right boom section 304 can rotate in a clockwise fashion (356) with respect to the center section 306, and/or the center section 306 can rotate in a clockwise fashion (358) with respect to the application vehicle (not shown).

The examples shown in FIGS. 5 and 6 illustrate other terrain configurations that the boom 300 may encounter. In each example, the boom controller receives measurements from the sensors and adjusts the boom shape by adjusting the orientations of one or more of the boom sections to correspond to various contours of the ground surface 338. As shown in those figures, in embodiments, the center section 306 can pivot 358 and/or move vertically (360) as part of the positioning process. In embodiments, the contours can be anticipated using forward-looking sensors, a look-ahead-module (LAM), or the like.

According to embodiments, if a change in position of one boom section, for example, the center section 306, changes the position of another boom section, for example, the left boom section 302, away from a predetermined height (e.g., an adjustment criterion), the boom controller can identify that change and, when directing the movement of the center section 306, the boom controller can direct a movement of the left boom section 302 to restore that section to the predetermined height (e.g., such that the adjustment criterion is satisfied). In embodiments, the boom controller simply moves the center section 306 without specifically addressing the effect of that movement on the other sections. In embodiments, the boom controller adjusts each section individually in an iterative process, so that any change transmitted by the coupled boom sections can be quickly addressed.

According to embodiments, the heights of sections of a boom can be adjusted using a number of different mechanisms. As illustrated in FIG. 7, for example, the right and left sections of a boom (not shown) can be adjusted using a center section 400 that includes two independent sliding sections 402 and 404. In embodiments, the left center section 402 can include a sensor 406 and can slide vertically 410 to adjust the height 412 of the left center section 402 above the ground surface 414. Similarly, the right center section 404 can include a sensor 408 and can slide vertically 416 to adjust the height 418 of the left center section 404 above the ground surface 414. In embodiments, the left and right center sections 402 and 404 can be adjusted independently. In embodiments, the adjustment of one of the center sections 402 or 404 can be dependent upon adjustments to the other. In embodiments, the center section 400 can include any number of additional adjustable sections.

According to embodiments, a boom may have a single center section that is adjustable using rotational and sliding mechanisms. For example, FIG. 8 illustrates a boom center section 500 that may rotate (502) about a pivot 504 and/or may move vertically (506). In embodiments, the pivot 504 can be located at any position on the center section 500. In embodiments, the pivot 504 can include (or be included within) a mechanism that provides the vertical movement (506) or can be independent thereof. According to embodiments, the center section 500 can include sensors 508 and 510 that measure the height (512 and 514, respectively) between the center section 500 and the ground surface 516. The boom controller can adjust the center section 500 based on the measurements from sensors 508 and 510.

Figure 9:
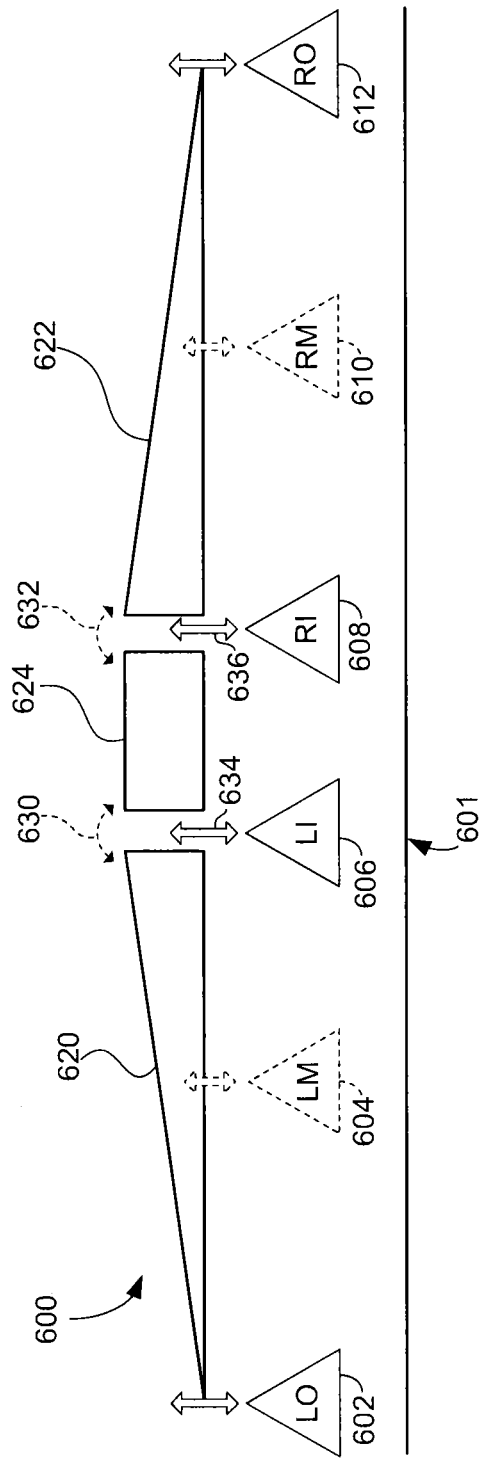
FIG. 9 illustrates a suspended boom with three boom sections and six sensors in accordance with embodiments of the invention.

According to embodiments, boom shape adjustment can be facilitated by using six or more downward-looking sensors. FIG. 9 illustrates embodiments in which a boom 600 includes six downward-looking sensors. Specifically, the boom 600 includes a left outer sensor ("LO") 602, a left middle sensor ("LM") 604, a left inner sensor ("LI") 606, a right inner sensor ("RI") 608, a right middle sensor ("RM") 610, and a right outer sensor ("RO") 612. The LO 602 and the LM 604 are placed on a left boom section 620. The RO 612 and the RM 610 are placed on a right boom section 622. In embodiments, the LI 606 and the RI 608 are placed on the left boom section 620 and the boom section 622, respectively, and, in embodiments, the LI 606 and the RI 608 are placed on the center section 624. In embodiments, there are various ways in which the sections of the boom 600 can move. For example, in embodiments, the left boom section 620 can rotate (e.g., pivot) (630) relative to the center section 624. The right boom section 622 can rotate (632) relative to the center section 624. In addition, the left boom section 620 and/or the right boom section 622 may move vertically (634 and 636, respectively).

Figure 10:
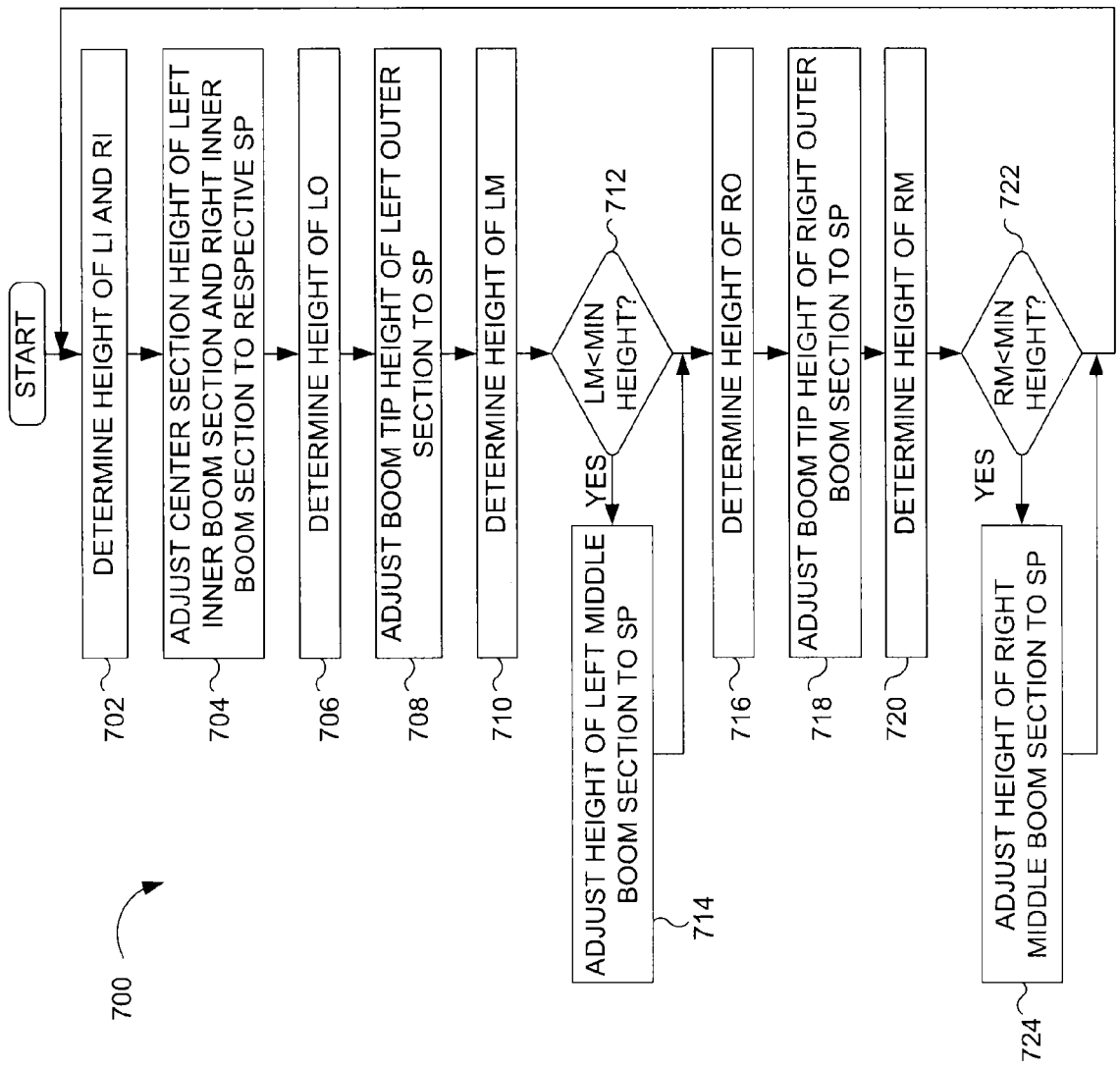
FIG. 10 is a flow diagram depicting a method for adjusting positions of boom sections in accordance with embodiments of the invention.

In embodiments, a boom controller can use measurements from the six sensors described above to determine how to move various boom sections to adjust the shape of the boom 600. FIG. 10 illustrates an example of an iterative algorithm that can be used by a boom controller to adjust the shape of the boom 600. As illustrated in FIG. 10, for example, the boom controller receives measurements from the LI 606 and the RI 608 (block 702). The boom controller then compares those measurements against adjustment criteria such as, for example, predetermined heights or set point values ("SP") for those sensors to determine whether a boom-adjustment is warranted. If an adjustment criterion is not satisfied, the boom controller determines whether to rotate the center section 624, whether to raise or lower the center section 624, or whether to do some combination of the two, and communicates an actuation command to a boom actuation system, which executes the command to adjust the center section 624 so that the measurement by the LI 606 and the RI 608 each match, within a predetermined error range, their respective set point values (SPs) (block 704). In embodiments, in order to calculate how far to rotate the center section 624, the boom controller can use a rotational matrix to translate rotational movements into vertical movements.

The boom controller receives a measurement from the LO 602 (block 706). The boom controller then compares that measurement against an adjustment criterion (e.g. SP) for that sensor. Based on the differences, if any, between that measurement and the SP, the boom controller determines whether to rotate (630) the left boom section 620 so that the distance measurement by the LO 602 matches, within a set error range, the SP and communicates an actuation command to cause the adjustment (block 708). The boom controller also receives a measurement from the LM 604 (block 710). The boom controller then compares that measurement to a set point value (SP) for that sensor (block 712). Based on the differences, if any, between that measurement and the set point value, the boom controller determines whether to rotate (630) the left boom section 620 so that the measurements by the LM 604 matches, within a predetermined error range, the set point value and communicates an actuation command to cause the adjustment (block 714). In the embodiments shown in FIG. 10, the set point value for the LM 604 is a minimum height. Rather than moving the left boom section 620 so that the measurement from the LM 604 matches that minimum height, the boom controller can determine whether the measurement is greater than or equal to the minimum height. If so, then no adjustments are made to the position of the left boom section 620. If the measurement is less than the minimum height, the boom controller causes adjustment of the left boom section 620 so that the measurement from the LM 604 is equal to, within a predetermined error range, the minimum height.

The boom controller also receives a measurement from the RO 612 (block 716). The boom controller then compares that measurement against an adjustment criterion (e.g., SP) for that sensor. Based on the differences, if any, between that measurement and the SP, the boom controller determines whether to rotate (632) the right boom section 622 so that the measurement by the RO 612 matches, within a predetermined error range, the set point value (SP) and communicates an actuation command to cause the adjustment (block 718).

The boom controller also receives a measurement from the RM 610 (block 720). The boom controller then compares that measurement to an adjustment criterion (e.g., SP) for that sensor (block 722). Based on the differences, if any, between that measurement and the SP, the boom controller determines whether to rotate (632) the right boom section 622 so that the measurement by the RM 610 matches, within a predetermined error range, the SP (block 724). In the illustrated embodiments, the set point value for the RM 610 can be a minimum height. Rather than moving the right boom section 622 so that the measurement by the RM 610 matches that minimum height, the boom controller can determine whether the measurement is greater than or equal to the minimum height. If so, then no further adjustments are made to the position of the right boom section 622. If the measurement is less than the minimum height, the boom controller adjusts the right boom section 622 so that the measurement of the RM 610 is equal to, within a set error range, the minimum height.

In the embodiments depicted in FIG. 10, the boom controller adjusts the position of the left and right boom sections without combining or subtracting the measurements of any two sensors. While, in embodiments, the distance measurements of the left inner sensor (LI) and the right inner sensor (RI) can be combined, the boom controller does not need a third signal (e.g., a measurement from a roll sensor) in order to adjust the position of any section of the boom. As shown in FIG. 10, the iterative algorithm then returns to block 702 and begins the adjusting process again. In this manner, the boom controller can adjust each position of the boom without determining or measuring, for example, the roll position of the boom. Adjusting the position of the boom without needing the roll position, which often requires a more expensive roll sensor, can provide a more cost-effective solution to dynamic boom shape adjustment operations.

Figure 11:
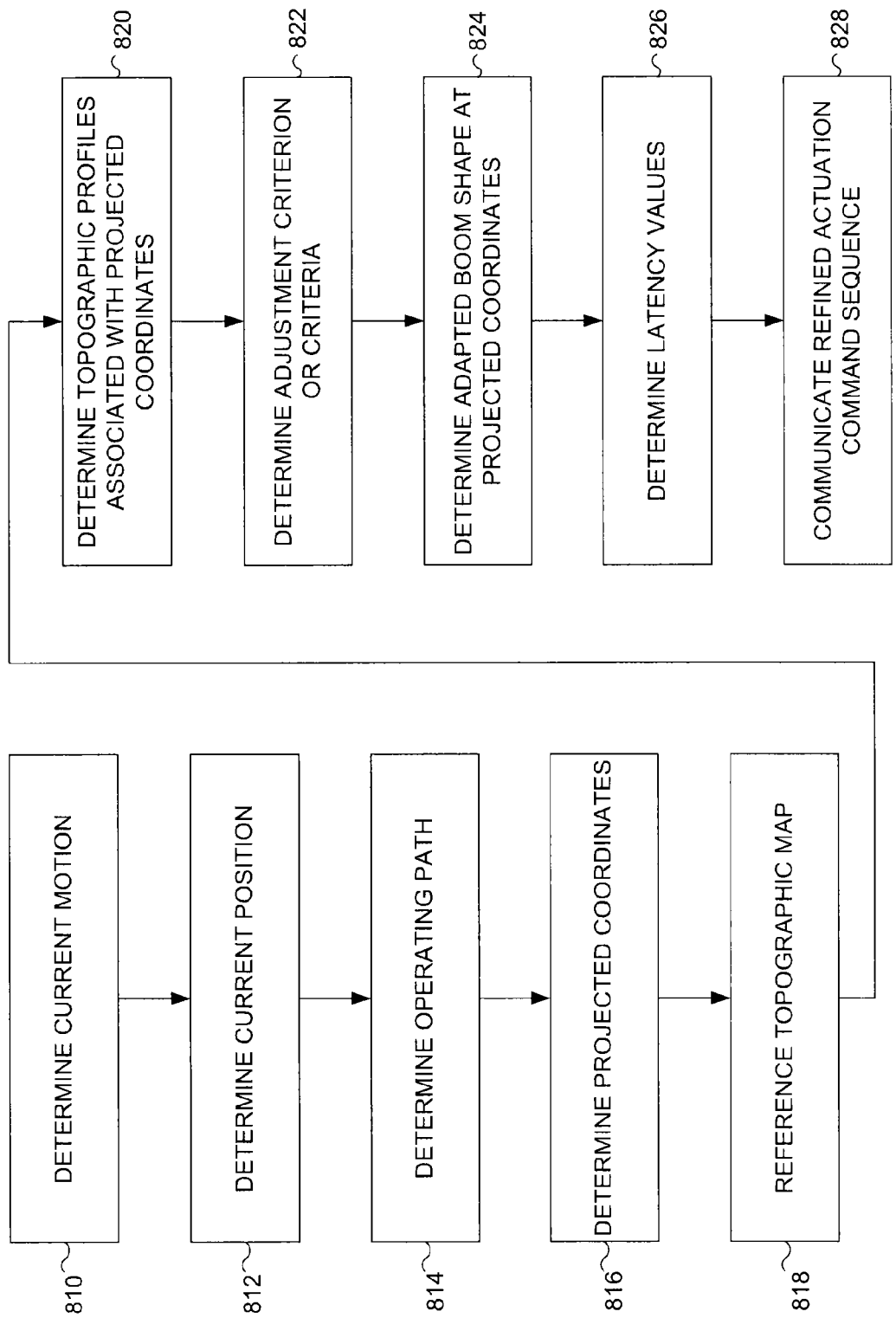
FIG. 11 is a flow diagram depicting a method for adjusting a shape of a boom sections in accordance with embodiments of the invention.

As described above, in embodiments, the boom shape adjustment operations can be enhanced by using a Look-Ahead Module (LAM) to anticipate obstacles warranting boom-adjustment operations. FIG. 11 is a flow chart depicting an illustrative method 800 of dynamically adjusting a boom shape utilizing a LAM. Embodiments of the method 800 include determining a current motion of the vehicle (block 810). As the term is used herein, "current motion" can refer to a speed, a direction of motion, acceleration, steering angle, curvature, or the like. In embodiments, a boom controller (e.g., boom controller 232) receives the current motion from one or more motion sensors. In embodiments, motion sensors can include, for example, a vehicle speed sensor such as a sensor in communication with the vehicle control system that obtains information about the vehicle's speed from rotation of a wheel, a transmission component, or the like. In embodiments, motion sensors such as IMUs, accelerometers, and the like, can be used to determine the current motion. Additionally, in embodiments, a GPS component (e.g., GPS component 216 in FIG. 2) can obtain current motion information that can be referenced by the boom controller.

In embodiments, the method 800 includes determining a current geographic position of the boom (block 812), which may include a current position of each boom section, portions of the boom (e.g., portions of boom sections, etc.), or the like. For example, in embodiments, the current geographic position of a portion of the boom is determined based on a current geographic position of the vehicle. In embodiments, a Look-Ahead Module (e.g., LAM 236 shown in FIG. 2) references an operating path (block 814) and determines projected coordinates of the boom, the application vehicle, the tines of the vehicle, boom sections, portions of boom sections, or the like (block 816) based on the operating path, the current motion, and the current position. According to embodiments, a projected coordinate can include a predicted geographic position of the portion of the boom corresponding to, for example, a future time. In embodiments, for example, a projected coordinate can be determined for a time interval that is defined by a maximum time delay corresponding to an adjustment between a given boom shape and any other boom shape. For example, if five seconds are needed to re-shape the boom from a first boom shape to a second boom shape, the projection time interval may be selected to be five seconds. In embodiments, the projected coordinates can include predicted geographic positions corresponding to distance intervals along an operating path. In embodiments, other selections for shorter or longer times, distances, or other frames of reference can be selected based on input information, availability of computational resources, desired boom shape operations, and the like.

Based on the projected coordinates, the boom controller references a topographic map (block 818) to determine topographic profiles associated with the projected coordinates (block 820). In embodiments, the boom controller can reference a topographic map that includes information about obstacles such as crops, object, and the like. According to embodiments, topographic profiles can include information about changes in elevation of a ground surface, the dimensions of objects or contours, the height of crops, and the like. In embodiments, the boom controller can determine topographic profiles associated with the projected coordinates of various portions along the boom, along the path of the tires of the application vehicle, and the like. In embodiments, the boom controller can determine topographic profiles at any number of different types of intervals (e.g., length intervals such as one foot, time intervals corresponding to projected coordinates, symmetric grid patterns, asymmetric grid patterns, and the like) for the projected coordinates and along the boom-width. In embodiments, refinement methods such as interpolation and extrapolation can also be used by the boom controller in determining topographic profiles.

According to embodiments of the method 800, the boom controller anticipates that one or more adjustment criteria will not be satisfied at the projected coordinates (block 822). According to embodiments of the invention, adjustment criteria can include, for example, fixed set point values (e.g., minimum height above a ground surface or crop), variable set point values (e.g., minimum height that changes based on whether the ground surface includes crops, weeds, etc.), maximum height above a ground surface or crop, ranges of heights, servo algorithms, and the like. In embodiments, the adjustment criterion (or criteria) can vary based on the type of agricultural application operation that is to be (or is being) performed. Based on the adjustment criterion (or criteria), the projected coordinates, the topographic profiles, and, in embodiments, additional inputs, the boom controller determines an adapted boom shape corresponding to a projected coordinate (block 824). In embodiments, the boom controller can determine one or more boom shapes corresponding to one or more projected coordinates. In embodiments, the boom controller can determine the adapted boom shape based on additional inputs such as current boom shape, boom section and boom center relative elevation positioning capability, and the like.

According to embodiments, one or more of the adapted boom shapes may not be able to be achieved by the desired time because of the latency of information retrieval, computation and actuation times involved. For example, determining current position and speed may take 20 milliseconds, retrieval of the topographic map information may take another 20 milliseconds, actuation of a boom section may take 100 milliseconds, and height servo response time (e.g., the time for performing aspects of the boom adjustment control algorithms discussed herein) may take between 500 and 5000 milliseconds, thereby resulting in a total latency of, for example, 640-5140 milliseconds. In embodiments, to account for latencies such as these, the boom controller can determine an actuation command sequence based, in part, upon estimated or empirically-determined latency values.

As shown at block 826, the boom controller determines latency values, which may be determined, for example, by referencing a memory component (e.g., memory component 222 shown in FIG. 2) having latency values stored therein. Latency values can be associated with actuation times, communication times, information retrieval times, calculation times, and the like. Based on the determined latency values, the boom controller refines an actuation command (or sequence of commands), which is communicated to a boom actuation system (block 828). According to embodiments, the command sequence establishes step-by-step actuator positions of the boom sections associated with the projected coordinates and can include instructions corresponding to times for executing the commands that allow for each adapted boom shape to be achieved by the time the boom reaches the location corresponding to that adapted boom shape. In embodiments of the method 800, the boom controller can store information such as, for example, the determined topographic profiles, adapted boom shapes and command sequences. Additionally, in embodiments, the method 800 can be repeated any number of times such as, for example, each time the vehicle advances to a next projected coordinate, each time the vehicle's velocity changes, each time the vehicle's direction changes, at the discretion of an operator of the vehicle, and the like.

Various modifications and additions can be made to the exemplary embodiments discussed herein without departing from the scope of the present disclosure. For example, while embodiments described above refer to particular features, the scope of this disclosure also includes embodiments having different combinations of features and embodiments that do not include all of the described features. For example, in embodiments, the topographic map may represent information other than (or in addition to) terrain elevation information such as, for example, locations and dimensions of obstacles such as fences, man-made objects, trees, and the like. In an example, the topographic map can include the location of a fence at the boundary of a field. In many typical agricultural application operations, as an application vehicle completes a straight-line portion of an operation path, the vehicle approaches the field boundary and makes a sharp turn for the next portion of the path. Depending on the turn, the outermost boom section can be subject to hitting the fence. Referencing stored information about the fence location and its height (e.g., included in a topographic map) can facilitate generating an actuation command to raise the boom section to avoid a collision with the fence. In embodiments, as soon as the boom clears the fence, it can be lowered to resume the application operation. Any number of other various types of embodiments may be contemplated within the ambit of this disclosure. Accordingly, the scope of the present disclosure is intended to embrace all such alternatives, modifications, and variations as fall within the scope of the claims, together with all equivalents thereof.

While the subject matter of embodiments of the disclosure is described with specificity, the description itself is not intended to limit the scope of this patent. Rather, the inventors have contemplated that the claimed subject matter might also be embodied in other ways, to include different steps or features, or combinations of steps or features similar to the ones described in this document, in conjunction with other technologies. Moreover, although the term "block" may be used herein to connote different elements of methods or algorithms employed, the term should not be interpreted as implying any particular order among or between various steps herein disclosed unless and except when the order of individual steps is explicitly called for.

The following is claimed:

1. A method for adjusting a shape of a boom that is adjustably coupled to an application vehicle, the boom having a boom section, the method comprising:
   receiving a current motion of the application vehicle from a motion sensor;
   anticipating, based on the current motion, that an adjustment criterion will not be satisfied at a projected coordinate corresponding to a portion of the boom;
   determining one or more latency values by referencing a memory component, wherein the one or more latency values are stored in the memory component, wherein the one or more latency values comprise an amount of time associated with at least one of information retrieval and computation; and
   determining, based at least in part on the one or more latency values, an actuation command configured to cause a boom actuation system to adjust a shape of the boom before the portion of the boom reaches the projected coordinate;
   communicating the actuation command to the boom actuation system;
   receiving a measurement from at least one of a plurality of downward-looking sensors attached to the boom, the measurement indicating the distance from the at least one downward-looking sensor to a ground surface substantially beneath the downward-looking sensor;
   determining, based on the measurement, that the adjustment criterion is not satisfied; and
   adjusting, upon determining that the adjustment criterion is not satisfied, the actuation command.

2. The method of claim 1, wherein the adjustment criterion comprises a minimum distance that is to be maintained between the at least one downward-looking sensor and the ground surface substantially beneath the at least one downward-looking sensor.

3. The method of claim 1, wherein anticipating that the adjustment criterion will not be satisfied at the projected coordinate further comprises receiving a measurement from at least one forward-looking sensor, wherein the measurement corresponds to a distance between the at least one forward-looking sensor and a ground surface associated with the projected coordinate.

4. The method of claim 1, wherein anticipating that the adjustment criterion will not be satisfied at the projected coordinate comprises:
   receiving a current geographic position of the application vehicle from a global positioning system (GPS) component;
   determining, based on the current geographic position of the application vehicle, a current geographic position of the portion of the boom; and
   determining the projected coordinate corresponding to the portion of the boom, wherein the projected coordinate comprises a predicted location of the portion of the boom at a future time.

5. The method of claim 4, wherein anticipating that the adjustment criterion will not be satisfied comprises referencing an operating path stored in the memory component.

6. The method of claim 4, wherein anticipating that the adjustment criterion will not be satisfied comprises referencing a topographic map stored in the memory component, the topographic map including elevation information associated with the projected coordinate.

7. The system of claim 4, wherein the one or more latency values comprise an amount of time that the GPS component takes to determine the current geographic position of the application vehicle.

8. The system of claim 6, wherein the one or more latency values comprise an amount of time taken to reference the topographical map.

9. A system for adjusting a shape of a boom that is adjustably coupled to an application vehicle, the system comprising:
   a motion sensor configured to determine a current motion of the application vehicle, wherein the current motion comprises a speed, a direction of travel, and a steering angle;
   a global positioning system (GPS) component configured to determine a current geographic position of the application vehicle; and
   a boom controller configured to (1) determine, based on the current motion of the application vehicle and the current geographic position of the application vehicle, a projected coordinate, the projected coordinate comprising a predicted location of a portion of the boom at a future time, (2) anticipate that an adjustment criterion will not be satisfied at the projected coordinate, and upon anticipating that the adjustment criterion will not be satisfied, (3) communicate an actuation command to a boom actuation system to adjust a shape of the boom before the portion of the boom reaches the projected coordinate.

10. The system of claim 9, further comprising a memory component having an operating path stored therein, the operating path comprising a plurality of geographic coordinates defining a particular path to be traversed by the application vehicle while performing an application task, wherein the boom controller is configured to determine the projected coordinate based, in part, on the operating path.

11. The system of claim 10, wherein the projected coordinate corresponds to a turn that the vehicle is anticipated to make, and wherein the boom controller is configured to anticipate that the adjustment criterion will not be satisfied at the projected coordinate by determining that, based on the speed of the vehicle, when the vehicle makes the turn, a momentum associated with the outer boom section will cause the outer boom section to move toward the ground, causing a distance between the outer boom section and the ground to be less than a set point.

12. The system of claim 11, wherein the adapted boom shape is configured to compensate for the effect of the momentum associated with the outer boom section.

13. The system of claim 11, wherein the boom controller is further configured to (1) determine, based on the operating path, an anticipated turn radius corresponding to the turn; and (2) identify an amount of adjustment of the boom shape necessary to compensate for the turn radius, wherein the command sequence comprises procedures to lower the outer boom section as the vehicle exits the turn.

14. The system of claim 11, further comprising at least one inertial measuring unit configured to identify a plurality of forces acting upon the outer boom section.

15. The system of claim 11, further comprising at least one proximity sensor configured to account for vehicle carriage flexibility, wherein the vehicle carriage flexibility comprises a compressibility of one or more tires coupled to the vehicle.

16. A method for adjusting a shape of a boom that is adjustably coupled to an application vehicle, the boom having a boom section, the method comprising:
receiving a current motion of the application vehicle from a motion sensor;
anticipating, based on the current motion, that an adjustment criterion will not be satisfied at a projected coordinate corresponding to a portion of the boom;
determining one or more latency values by referencing a memory component, wherein the one or more latency values are stored in the memory component, wherein the one or more latency values comprise an amount of time associated with at least one of information retrieval and computation;
determining, based at least in part on the one or more latency values, an actuation command configured to cause a boom actuation system to adjust a shape of the boom before the portion of the boom reaches the projected coordinate; and
communicating the actuation command to the boom actuation system.

17. The method of claim 16, wherein anticipating that the adjustment criterion will not be satisfied at the projected coordinate comprises:
receiving a current geographic position of the application vehicle from a global positioning system (GPS) component;
determining, based on the current geographic position of the application vehicle, a current geographic position of the portion of the boom; and
determining the projected coordinate corresponding to the portion of the boom, wherein the projected coordinate comprises a predicted location of the portion of the boom at a future time.

18. The method of claim 16, wherein anticipating that the adjustment criterion will not be satisfied comprises referencing an operating path stored in the memory component.

19. The method of claim 16, wherein anticipating that the adjustment criterion will not be satisfied comprises referencing a topographic map stored in the memory component, the topographic map including elevation information associated with the projected coordinate.

20. A system for adjusting a shape of a boom that is adjustably coupled to an application vehicle, the system comprising:
a memory component having an operating path stored therein, the operating path comprising a plurality of geographic coordinates defining a particular path to be traversed by the application vehicle while performing an application task;
a global positioning system (GPS) component configured to determine a current geographic position of the application vehicle and a current motion of the application vehicle, wherein the current motion comprises a current speed and a current direction of travel; and
a boom controller configured to:
determine, based on (1) the current geographic position, (2) the current motion and (3) the operating path, a projected coordinate, the projected coordinate comprising a predicted location of a portion of the boom at a future time;
reference a topographical map comprising terrain elevation information and obstacle information, wherein the obstacle information comprises locations and dimensions of obstacles;
anticipate that an adjustment criterion will not be satisfied at the projected coordinate;
determine a current boom shape;
determine an adapted boom shape based on the current boom shape, the adjustment criterion, the projected coordinate, and the topographical map;
generate an actuation command sequence, wherein the command sequence establishes step-by-step actuator positions;
determine one or more latency values by referencing a memory component, wherein the latency values are stored in the memory component;
refine the actuation command sequence based on the one or more latency values; and
communicate the refined command sequence to a boom actuation system to cause the boom actuation system to achieve the adapted boom shape before the portion of the boom reaches the projected coordinate.

21. The system of claim 20, wherein the GPS component is configured to create the topographical map.

22. The system of claim 20, wherein the projected coordinate corresponds to a turn that the vehicle is anticipated to make, and wherein the boom controller is configured to anticipate that the adjustment criterion will not be satisfied at the projected coordinate by determining that, based on the speed of the vehicle, when the vehicle makes the turn, a momentum associated with the outer boom section will cause the outer boom section to move toward the ground, causing a distance between the outer boom section and the ground to be less than a set point.

23. The system of claim 22, wherein the adapted boom shape is configured to compensate for the effect of the momentum associated with the outer boom section.

24. The system of claim 22, wherein the boom controller is further configured to (1) determine, based on the operating path, an anticipated turn radius corresponding to the turn; and (2) identify an amount of adjustment of the boom shape necessary to compensate for the turn radius, wherein the command sequence comprises procedures to lower the outer boom section as the vehicle exits the turn.

25. The system of claim 22, further comprising at least one inertial measuring unit configured to identify a plurality of forces acting upon the outer boom section.

26. The system of claim 22, further comprising at least one proximity sensor configured to account for vehicle carriage flexibility, wherein the vehicle carriage flexibility comprises a compressibility of one or more tires coupled to the vehicle.

27. The system of claim 20, wherein the one or more latency values comprise an amount of time associated with at least one of information retrieval and computation.

28. The system of claim 27, wherein a first latency value of the one or more latency values comprises an amount of time that the GPS component takes to determine the current geographic location of the vehicle and the current motion of the vehicle.

29. The system of claim 28, wherein a second latency value of the one or more latency values comprises an amount of time that the boom controller takes to reference the topographical map.

* * * * *